United States Patent [19]

Maroldo et al.

[11] Patent Number: 5,037,857

[45] Date of Patent: Aug. 6, 1991

[54] HIGH-SURFACE-AREA FIBER

[75] Inventors: Stephen G. Maroldo, Harleysville; Richard M. Kopchik, Southampton; Eric J. Langenmayr, Laverock, all of Pa.

[73] Assignee: Rohm and Haas Company, Philadelphia, Pa.

[21] Appl. No.: 399,209

[22] Filed: Aug. 28, 1989

Related U.S. Application Data

[62] Division of Ser. No. 113,574, Oct. 26, 1987, abandoned.

[51] Int. Cl.$^5$ .............................................. C08J 5/20
[52] U.S. Cl. ...................................... 521/29; 428/394; 521/32; 521/33; 521/73; 521/75; 525/332.2
[58] Field of Search ................. 525/332.2; 521/29, 32, 521/33, 73, 75; 428/394

[56] References Cited

U.S. PATENT DOCUMENTS

| | | | |
|---|---|---|---|
| 3,006,866 | 7/1961 | Corte et al. | 525/332.2 |
| 3,586,646 | 6/1971 | Corte et al. | 525/332.2 |
| 3,594,333 | 7/1971 | Buss et al. | 525/332.2 |
| 3,625,870 | 10/1971 | Norwood | 525/332.2 |
| 3,729,457 | 4/1973 | Davankov et al. | 525/332.2 |
| 3,812,061 | 5/1974 | Barrett | 525/332.2 |
| 3,991,017 | 11/1976 | Barrett et al. | 525/242 |
| 3,994,719 | 11/1976 | Corte et al. | 525/332.2 |
| 3,997,706 | 12/1976 | Galeazzi | 525/332.2 |
| 4,191,813 | 3/1980 | Reed et al. | 525/329.3 |
| 4,200,695 | 4/1980 | Chong et al. | |
| 4,263,407 | 4/1981 | Reed, Jr. | |
| 4,359,537 | 11/1982 | Chong | |
| 4,543,365 | 9/1985 | Itagaki et al. | 25/332.2 |

FOREIGN PATENT DOCUMENTS 229992 11/1985 German Democratic Rep.
145617 11/1975 Japan.
120986 10/1977 Japan.

OTHER PUBLICATIONS

Bull. Chem. Soc. Japan, vol. 56, No. 12, 3726–29 (1983) Yoshioka et al. (pp. 4 and 7).

Primary Examiner—Bernard Lipman

[57] ABSTRACT

Polyaromatic fibers or microbeads which are swollen with solvent and crosslinked while swollen in such a way that the expanded, or macronet, structure of the swollen fiber or microbead is stabilized and retained even after drying exhibit high surface area and significant adsorptive capacity.

10 Claims, No Drawings

HIGH-SURFACE-AREA FIBER

This is a division of application Ser. No. 113,574, filed Oct. 26, 1987 now abandoned.

This invention relates to polymeric adsorbents and more particularly to high-surface-area polymeric fibers and microbeads useful as adsorbents.

BACKGROUND OF THE INVENTION

Adsorbents are commonly solid materials which exhibit selectivity at their surface for substances in a mixture, thereby providing a means of separating such substances from the mixture. The high surface area characteristic of adsorbents (usually well above 5 m$^2$/g of material) normally results from a fine particle size (non-porous adsorbents) or from pores in the adsorbent particles (porous adsorbents). Carbon black, $TiO_2$ and $ZnO$ pigments are examples of non-porous adsorbents. Granular carbon, silica gel, bone char, certain soils and asbestos are examples of well-known porous adsorbents obtained from naturally occurring materials. These suffer seriously from high moisture adsorption in humid atmospheres, poor reproducibility during manufacture, and fragmentation during use in cyclic processes, because their rigid structures are broken by the high osmotic pressure of adsorbed materials in their small pores.

For separation or purification of complex substances (such as pharmaceuticals) synthetic adsorbents have been developed, some of which serve also as ion exchange materials or as intermediates for the manufacture of ion exchange materials. However, ion exchange is an absorption as well as an adsorption phenomenon, so that although all ion exchange materials are adsorbents, the converse is not necessarily true.

The synthetic adsorbents generally are porous polymeric solids, polystyrene and styrene-divinylbenzene copolymers being representative. Although it is possible to prepare synthetic polymers that are finely divided or to grind such polymers to a fine particle size, to obtain high surface area, fine particle size adsorbents cannot be used in cyclic processes, particularly processes involving columns, since the fine particles pack too tightly and impede flow. Moderately large adsorbent particles on the order of about 0.02 mm to 2 mm diameter or larger, are therefore required. Polymeric beads, obtained by known suspension polymerization techniques, have a convenient particle size for use in columnar operations. While the polymeric adsorbents can be made hydrophobic and the bead form makes them more useful, their adsorbent properties have been too limited for the adsorbents to compete effectively with the carbonaceous adsorbents obtained by pyrolyzing of organic materials.

Macronet adsorbents in bead form are taught by Reed, U.S. Pat. No. 4,263,407, which is hereby incorporated into the present specification by reference. They are produced by swelling a lightly crosslinked, macroreticular, aromatic polymer bead in an inert organic solvent, and then post-crosslinking the swollen beads with an external crosslinker. These adsorbents are called "macronets" because the crosslinks are stable and have a long and rigid structure which allows the polymer to retain the displacement of the chains to significant distances from one another that occurs during solvent swelling, even after the solvent has been removed.

Itagaki et al., U.S. Pat. No. 4,543,365 disclose bead materials similar to those of Reed, but employing more highly crosslinked resins.

East German Offenlegungschrift 229,992 teaches a one-step preparation of high-surface-area, sulfonic acid resin beads from lightly crosslinked, suspension-polymerized polystyrene beads by chloromethylation and sulfonation in the presence of a swelling solvent; the resulting beads appear to be macronet beads.

Fibers have particular advantages over conventional adsorbents like carbon filaments or granular, activated carbons; they may be woven or otherwise processed into cloth or other textile materials for making garments protective against chemicals, filters for air purification systems, and the like. They, and other polymeric adsorbents, are also easier to regenerate and less sensitive to high humidity than activated carbons.

Fibers, by their small diameter, provide relatively high surface areas, and chemically modified, polystyrene-based fibers are known, as for example those of Yoshioka et al., Bull. Chem. Soc. Japan 56, 3726 (1983) or Japanese Kokai 77-120986. These fibers are composites of a vinylaromatic polymer matrix and longitudinal fibrils of alpha-olefin polymer imbedded in the matrix. The references teach treatment of the vinylaromatic surface of the fibers to attach functional groups such as sulfonic acid groups and amine or ammonium groups.

Japanese Kokai 75-145617 discloses treating phenol-formaldehyde polymer fibers with alkylating reagents such as paraformaldehyde in acidic media, a reaction which the above Yoshioka and Kokai 77-120986 use to prepare the surface for functionalization. In Kokai 75-145617 this reaction is followed by a mild pyrolysis in an oxidizing atmosphere at temperatures from 250° to 450° C.; the reference reports that this treatment enhances the surface area of the fibers to at least 10 m$^2$/g and as much as 400 m$^2$/g.

Another approach to porous fibers is disclosed by Sruta et al., *Chemicke Vlakna*, 1986, 36, No. 3, pages 175-181. This reference discloses porous polyester fibers formed when calcium carbonate, spun into the fibers as a delustrant, is dissolved with acid.

An object of the present invention is to provide adsorbent fibers with high adsorptive capacity for gases, vapors and the like. A further object of the present invention is to provide high-surface-area fibers bearing chemical functionality suitable for chemical interactions commonly encountered in adsorptive, organic-reactive or ion-exchange phenomena. Another object of the present invention is to provide an adsorptive filter medium which can provide the adsorption rate of a bed of fine, particulate adsorbers while avoiding the problems of high pressure drop, filter clogging and the like. Yet another object is to provide adsorbent microbeads with a high surface area and high capacity for gases, vapors and the like. Other objects of the present invention will be apparent from the specification.

THE INVENTION

We have discovered crosslinked poly(vinylaromatic) macronet compositions which possess high surface area and significant adsorptive capacity, which compositions may have the form of fibers or microbeads, and a process for making such compositions which comprises swelling a crosslinked poly(vinylaromatic) polymer structure with a swelling solvent and further crosslinking the polymer while it is swollen, to form a stable, porous, highly adsorptive, macronet polymer structure when the solvent is removed.

DETAILED DESCRIPTION OF THE INVENTION

The preferred polymers which are converted to macronet structures in the process of the present invention are poly(vinylaromatic) polymers, more preferably polystyrene and polymers of substituted styrenes having 1–3 alkyl groups of 1–3 carbon atoms each, substituting the aromatic nucleus. Minor amounts, i.e., less than 50% by weight, of other monoethylenically unsaturated monomers capable of copolymerizing with the polyaromatic polymer may be copolymerized with it. A particularly preferred polymer is a heterogeneous polymeric fiber comprising a matrix of the polyaromatic polymer described above, optionally blended with another polymer, preferably a polyolefin, and imbedded longitudinally therein filaments of a second polymer phase, the second polymer being preferably a polyolefin and more preferably polypropylene or polybutenes such as poly(butene-1) or poly(3-methyl-1-butene). The diameter of the imbedded filaments may range from about 1 to about 10 $\mu$m. The polymer may be formed into fibers using conventional processes such as the melt spinning process described by Yoshioka et al., *Bull. Chem. Soc. Japan*, Vol. 56, page 3726 (1983).

Another preferred polymer is an emulsion polymerized poly(vinylaromatic) polymer as described above, in the form of a particle in the diameter range from about 0.01 to about 1 $\mu$m. Such particles are referred to herein as microbeads, and may be prepared according to emulsion or latex polymerization procedures that are well known in the art, such as those of Chong, et al., U.S. Pat. No. 4,200,695. Forming the macronet structure in such particles increases their size significantly above the size of the original polymer particle.

The resulting polymer structure, whether fiber or particle, is formed into a macronet by swelling it in a swelling agent, and crosslinking it, while it is swollen, in such a way as to stabilize the swollen polymer structure, i.e., to prevent the swollen structure from collapsing to its original structure when the swelling agent is removed. The swelling agents useful in the process of the present invention for initially swelling the polymer are those which swell the poly(vinylaromatic) polymer, do not interfere with the formation of the macronet structure and do not deactivate Friedel-Crafts catalysts. Preferred swelling agents have a boiling point above about 50° C. at atmospheric pressure, although lower boiling solvents may be used at higher pressures and temperatures above about 50° C.

Suitable swelling agents which meet these criteria may readily be selected by one skilled in the art from among aromatic hydrocarbons, halogenated hydrocarbons, nitroparaffins, nitroaromatic compounds, ring-halogenated aromatic compounds, aliphatic hydrocarbons of about six or more carbon atoms, and carbon disulfide.

Also suitable but less preferred as swelling agents are aliphatic and aromatic ethers of five or more carbon atoms. Swelling agents which participate in the crosslinking reaction are contemplated within the scope of the present invention, so long as they do not interfere with the reaction. Such participating swelling agents are at least difunctional, and include aliphatic 1,2-dihalo materials and side-chain chlorinated dialkylaryl hydrocarbons. Mixtures of the useful swelling agents may also be used.

Examples of suitable swelling agents selected from the above groups include toluene, xylene, chlorobenzene, styrene monomer, ethylene dichloride, propylene dichloride, alpha-alpha-dichloro-p-xylene and the like.

The stabilizing crosslinks, i.e., the long, rigid crosslinks that stabilize the expanded, or macronet, structure of the polymer may either be formed by adding a crosslinking reagent to the swollen polymer, or by adding a crosslink-promoting catalyst to a swollen polymer which contains active crosslink sites.

The matrix polymer of the fibers and the emulsion polymer do not normally contain a significant number of active crosslinking sites unless a monomer containing active sites is employed, such as vinylbenzyl chloride, or unless it is treated further. A preferred treatment for introducing active crosslinking sites is haloalkylaction. In this treatment a haloalkylating reagent such as methyl chloromethyl ether is allowed to react with the polymer to introduce haloalkyl groups which act as active crosslinking sites.

The catalysts useful for promoting the crosslinking reaction include the Friedel-Crafts catalysts, preferably Lewis acids such as ferric chloride, stannic chloride, aluminum trichloride, aluminum tribromide, boron trifluoride, zinc dichloride and the like. The preferred Lewis acid is ferric chloride.

The catalyst, optionally as a solution, is allowed to contact the swollen polymer containing the active crosslinking sites, preferably at a temperature of from about 15° C. to about 100° C., and allowed to react for from about two hours to about 24 hours at a temperature from about 15° C. to about 150° C., preferably from about 85° C. to about 105° C., to produce the macronet structures of the present invention.

In the absence of active crosslinking sites, the swollen matrix polymer or the emulsion polymer may also be crosslinked to form the macronet fibers or microbeads of the present invention by reacting it with a crosslinking reagent, as mentioned above. The crosslinking reagent is an acylating or alkylating agent, which includes the haloalkylating reagents useful for introducing active sites. Other haloalkylating reagents may be used, such as alpha,alpha-dechloro-p-xylene, methylene chloride, bis(4,4'-chloromethyl) biphenyl, bis(chloromethyl) thiophene, 1,4-dichlorohexane, 1,4-dichlorobutane, chloroform, carbon tetrachloride and the like. Other alkylating reagents such as polyols and polyolefins may also be used, for example, alkylene glycols such as ethylene glycol and propylene glycol, diepoxides, polybutadienes and the like. The alkylating agent may contain aromatic groups, provided the atoms of the alkylating agent which bond to the polymer are aliphatic carbon atoms. The alkylating agent may also be paraldehyde, formaldehyde or a formaldehyde generator in the presence of a strong acid such as sulfuric acid.

Difunctional acylating agents are also suitable for introducing active crosslinking sites; these agents are preferably aromatic, but may include aliphatic compounds. The preferred acylating agents are diacid chlorides, as for example fumaryl dichloride, maleyl dichloride, malonyl dichloride, oxalyl chloride, succinyl dichloride, adipyl dichloride and sebacyl dichloride. In the case of aromatic diacid chlorides the carbonyl groups must be separated by at least one carbon atom; suitable aromatic diacid chlorides include terephthaloyl chloride and isophthaloyl chloride, but not orthophthaloyl chloride (the carbonyl groups of which are not separated by at least one carbon atom) because it tends to form anthraquinon rings which in turn participate in redox reactions. Further suitable diacid chlorides include the 1,4-, 1,5- and 1,6-naphthoyl dichlorides and anthracene-1,5- and 1-9-diacid chlorides. Other suitable acylating agents include phosgene and thiophosgene. Other agents may act as crosslinkers, as for example sulfur halides such as sulfur monochloride, sulfur dichloride, and the corresponding sulfur bromides. The crosslinking reagent is allowed to react with the swollen polymer at a temperature of from about 15° C. to about 150° C. for from about two to about 24 hours.

Either process for forming the macronet crosslinks may occur in the presence of low-molecular weight coupling agents such as alpha,alpha-dichloro-p-xylene, trivinylbenzene, terephthaloyl dichloride and the like.

The macronet fibers and emulsion polymer particles of the present invention possess a high surface area, as measured by nitrogen adsorption (BET). They may be functionalized with chemically active functional groups to enhance selectivity of adsorbates, or to react with adsorbates. Examples of such groups include sulfonic acid groups, dimethylaminomethyl groups, quaternized alkyltrimethylammonium groups, oxime groups and the like.

The following examples are intended to illustrate the present invention and not to limit it, except as it is limited in the claims. All proportions are by weight unless otherwise stated, and all reagents are of good commercial quality unless otherwise stated.

EXAMPLE 1

This example illustrates the preparation of the preferred, non-homogeneous, polypropylene-in-polystyrene polymer and fibers from that polymer. This preparation is described in the Yoshioka reference cited above, and is believed to be the procedure by which the fiber samples used in the following examples were prepared; the actual fiber samples were obtained from Toray Industries, Sonoyama, Otsu 520, Japan.

Sixteen polypropylene filaments are melt spun at 255° C. within a matrix fiber of polystyrene blended with 20% by weight polypropylene; the weight ratio of polypropylene filaments to matrix polymer is 1:1. The fiber is drawn to five times its original length, to form a fiber 24 $\mu$m in diameter and containing 16 filaments of polypropylene, each 4.2 $\mu$m in diameter, embedded within the polystyrene-polypropylene matrix.

A portion of the resulting fibers is lightly crosslinked using a solution of 5% by weight paraformaldehyde, 25% by weight glacial acetic acid and 70% by weight concentrated sulfuric acid; a second portion is highly crosslinked using a similar reagent, and a third portion is uncrosslinked.

The three samples of fiber prepared according to the procedure above were tested for surface area by BET (using a Quantasorb Surface Area Analyzer and dried samples), and for elemental analysis; the following results were obtained:

| Fiber Sample | Cross-linking | Surface Area ($m^2/c$) | Elemental Analysis (%) | | | |
|---|---|---|---|---|---|---|
| | | | C | H | O | Cl |
| A | None | <1 | 88.17 | 10.95 | — | — |
| B | Light | <1 | 86.31 | 10.71 | 1.47 | — |

| Fiber Sample | Cross-linking | Surface Area ($m^2/c$) | Elemental Analysis (%) | | | |
|---|---|---|---|---|---|---|
| | | | C | H | O | Cl |
| C | High | <1 | 87.71 | 10.61 | 0.08 | — |

EXAMPLE 2

This example illustrates chloromethylation of the fibers of Example 1 to produce fibers having active crosslinking sites. For each of the crosslinked, heterogeneous fiber of Example 1, a 10-g sample was added to 80 ml methyl chloromethyl ether at ambient temperature, and the mixture was stirred for one hour. A solution of 9.4 ml stannic chloride in 10 ml methyl chloromethyl ether was added to the mixture over a period of 15 minutes while maintaining the temperature at 25°–30° C., the low temperature being selected to minimize secondary crosslinking. When the addition was complete the mixture was held at 30° C. for 4.5 hours, then cooled to 20° C., and 125 ml water was added over a period of 30 minutes while maintaining the temperature below 35° C., to quench the reaction. The solution was stirred for an additional 30 minutes, the fibers were filtered, and a wash step of resuspending in 100 ml deionized water, stirring for 30 minutes and refiltering was repeated twice. The fibers were then air dried for one hour and dried in a vacuum oven overnight at 50°–60° C. This procedure yielded 19.1 g of chloromethylated fiber containing 66.9% solids. Elemental analysis of the fiber showed 73.0% carbon, 8.96% hydrogen and 17.3% chlorine. The surface area of the chloromethylated fiber, measured by BET, was less than 1 $m^2/g$.

EXAMPLE 3

This example illustrates forming a macronet fiber from the chloromethylated fiber of Example 2. A 0.67-g sample of the fiber from Example 2 was transferred to a 100-ml, 3-neck flask fitted with reflux condenser and magnetic stirrer; 50 ml ethylene dichloride were added and the mixture was stirred for two hours to swell the polymer. To the mixture 0.5 ml stannic chloride was added, and the mixture was heated to reflux and allowed to reflux for 16 hours. The mixture was allowed to cool to room temperature, and the reaction was quenched by adding 100 ml acetone. The acetone was decanted from the fibers, which were washed once with another 100 ml of acetone and twice with 100-ml portions of water, the wash liquid being decanted from the fibers after each wash. The fibers were filtered and then allowed to air dry for one hour. The air-dried fibers were dried under vacuum at 50°–60° C. overnight.

EXAMPLES 4–24

The procedure of Example 3 was repeated, varying the starting fiber, the type and amount of the Friedel-Crafts catalyst and the solvent. Stannic chloride, aluminum chloride and ferric chloride were employed at mole ratios of fiber to catalyst ranging from 1.1:1 to 3.7:1, and solvents used were ethylene dichloride or methylene chloride; in Examples 13 and 14, 3.7 millimoles para-dichloroxylene was also present.

The fibers used were prepared according to Example 1, except that initial crosslinking of the fiber was either high or low. The resulting macronet fibers were examined for appearance and tested for surface area by BET; the results for these examples are shown in Table I.

TABLE I

| Sample from Example No. | Polymer Crosslinking (mmol) | Catalyst (mmol) | Ratio* | Solvent | Fiber Appearance | Surface Area by BET $m^2/g$ |
|---|---|---|---|---|---|---|
| 3 | High (5.8) | $SnCl_4$ (4.3) | 1.3 | EDC | Good | 247 |
| 4 | Low (5.8) | $SnCl_4$ (4.3) | 1.3 | EDC | Good | 172 |
| 5 | High (12.5) | $SnCl_4$ (8.5) | 1.5 | EDC | Good | 246 |
| 6 | Low (12.5) | $SnCl_4$ (8.5) | 1.5 | EDC | Good | 186 |
| 7 | High (9.6) | $AlCl_3$ (8.6) | 1.1 | EDC | Poor | — |
| 8 | Low (9.6) | $AlCl_3$ (8.6) | 1.1 | EDC | Poor/Good | 339 |
| 9 | High (9.6) | $AlCl_3$ (3.5) | 2.7 | EDC | — | 311 |
| 10 | Low (9.6) | $AlCl_3$ (3.5) | 2.7 | EDC | Good | <10 |
| 11 | High (9.6) | $SnCl_4$ (6.4) | 1.5 | MC | Good | <10 |
| 12 | Low (9.6) | $SnCl_4$ (6.4) | 1.5 | MC | Good | <10 |
| 13 | High (9.6) | $SnCl_4$ (6.4) | 1.5 | EDC** | Excellent | 194 |
| 14 | Low (9.6) | $SnCl_4$ (6.4) | 1.5 | EDC** | Good | 183 |
| 15 | High (25.5) | $SnCl_4$ (17.1) | 1.5 | MC | Good | <10 |
| 16 | Low (25.5) | $SnCl_4$ (17.1) | 1.5 | MC | Good | <10 |
| 17 | High (25.8) | $SnCl_4$ (17.1) | 1.5 | EDC | Excellent | 304 |
| 18 | Low (25.8) | $SnCl_4$ (17.1) | 1.5 | EDC | Good | 283 |
| 19 | High (25.5) | $AlCl_3$ (13.9) | 1.8 | EDC | Poor | 426 |
| 20 | Low (25.5) | $AlCl_3$ (13.9) | 1.8 | EDC | Poor | 586 |
| 21 | High (25.5) | $AlCl_3$ (6.9) | 3.7 | EDC | Good | 355 |
| 22 | Low (25.5) | $AlCl_3$ (6.9) | 3.7 | EDC | Good | 642 |
| 23 | High (25.0) | $FeCl_3$ (15.1) | 1.6 | EDC | Excellent | 440 |
| 24 | Low (25.0) | $FeCl_3$ (15.1) | 1.6 | EDC | Excellent | 317 |

EDC = Ethylene Dichloride
MC = Methylene Chloride
*Ratio = (mmol fiber/mmol catalyst)
**PDX = Paradichloroxylene (3.7 mmol also present)

EXAMPLE 25

This example illustrates forming a macronet fiber from fiber which does not have active crosslinking sites, by treating the fiber with a crosslinking reagent. A 15-g sample of crosslinked fiber prepared according to Example 1 was placed in a 1-liter flask, equipped with a reflux condenser and containing 300 ml ethylene dichloride and 4.5 g paraformaldehyde. The mixture was stirred for one hour, and 50 ml of concentrated sulfuric acid was added to it. The mixture was heated to reflux temperature and refluxed overnight. The mixture was allowed to cool and the reaction was quenched by adding 100 ml deionized water. The fibers were filtered, washed twice with 100 ml deionized water and twice with 100 ml methanol, and vacuum dried overnight at 50°-60° C.

EXAMPLES 26-32

The procedure of Example 25 was repeated using the same fibers, fibers with low crosslinking and no crosslinking, and felted and woven fibers. The fiber products of Examples 25-32 were examined for appearance and tested for surface area by BET. The results of the tests are shown in Table II.

TABLE II

| Sample from Example No. | Fiber of Example No. | Polymer Crosslinking | Fiber Appearance | Surface Area by BET $m^2/g$ |
|---|---|---|---|---|
| 25 | 1-C | High | Good | 215 |
| 26 | 1-B | Low | Good | 352 |
| 27 | 1-C | High | Excellent | — |
| 28 | 1-B | Low | Excellent | — |
| 29 | 1-C | Felted | — | 38 |
| 30 | 1-C | Woven | — | <10 |
| 31 | 1-A | Uncrosslinked | — | <10 |
| 32 | 1-A | Uncrosslinked | — | 362 |

EXAMPLE 33

This example illustrates forming macronet fibers from pure polystyrene fibers. The starting fibers were highly crosslinked polystyrene with a surface area of less than one square meter per gram by BET, obtained from Engineering Yarns, Coventry, R.I.

A solution of 40 ml glacial acetic acid, 2 g paraformaldehyde and 110 ml concentrated sulfuric acid was prepared in a 1-liter flask equipped with a reflux condenser. A 2-g sample of the polystyrene fiber was added, and the mixture was heated to 80° C., held at that temperature for two hours, and cooled to room temperature. A suspension of 1 g paraformaldehyde in 200 ml ethylene dichloride was added, the mixture was stirred one hour at room temperature to swell the fibers, then heated to reflux temperature and allowed to reflux overnight. The flask contents were cooled, the solvent was syphoned off, and the fibers were washed twice with 100 ml water followed by three acetone washes of 100 ml each. The washed fibers were dried under vacuum overnight at 50°-60° C. The surface area of the fibers, measured by BET, was 23 $m^2/g$.

EXAMPLE 34

The procedure of Eamaple 33 was repeated. The surface area, measured by BET, of the macronet fiber from Example 34 was 40 $m^2/g$.

EXAMPLES 35-40

These comparative examples illustrate that mere addition of a Lewis acid catalyst to swollen fibers that do not contain active crosslinking sites does not form macronet fibers. The fibers of Example 1 were swollen in either ethylene dichloride or methylene chloride, and a Lewis acid catalyst was added according to the procedure of Example 3. The mixtures were refluxed overnight, and isolated for testing according to Example 3. The fibers, catalysts and solvents for these examples are tabulated in Table III; the surface area of each material after treatment was less than 10 m²/g, indicating that no macronet structure had formed.

TABLE III

| Example | Fiber Crosslinking | Catalyst | Solvent | Surface Area by BET m²/g |
|---|---|---|---|---|
| 35 | Low | AlCl$_3$ | MC | <10 |
| 36 | High | AlCl$_3$ | MC | <10 |
| 37 | Low | SnCl$_4$ | EDC | <10 |
| 38 | High | SnCl$_4$ | EDC | <10 |
| 39 | Low | AlCl$_3$ | EDC | <10 |
| 40 | High | AlCl$_3$ | EDC | <10 |

EXAMPLES 41–42

These comparative examples illustrate that reaction of chlorosulfonated fibers with a Lewis acid does not form a macronet fiber. A flask was equipped with a heater and nitrogen blanket. To this 300 ml propylene dichloride and 10 g of fiber from Example 1B (for Example 41) or ethylene dichloride and 10 g of fiber from Example 1C (for Example 42) as a swelling solvent were added. The mixture was stirred for 1 hour, and 20 g chlorosulfonic acid was added. The mixture was heated to reflux (Example 41), or to 120° C. (Example 42), and maintained at that temperature overnight. The mixture was cooled, the chlorosulfonic acid was removed by suction and the chlorosulfonated fibers were washed twice with 500 ml of the same solvent in which they were swollen, and three times with 500 ml of methanol. A 5.5-ml portion of stannic chloride was added to the chlorosulfonated fibers, the mixture was heated to 80° C., maintained at that temperature overnight then isolated by washing and filtration. The fiber was dried under vacuum overnight at 50°-60° C. and was tested for surface area. Neither sample showed a significant enhancement in surface area.

EXAMPLE 43

This comparative example illustrates that amination of chlorosulfonated fibers does not form a macronet fiber. A solution of 500 ml ethylene dichloride and 6-7 g triethylenediamine was prepared in a 1-liter flask equipped with a reflux condenser. To this was added 8 g of the chlorosulfonated fibers of Example 2. The mixture was stirred for one hour, heated to reflux, and refluxed overnight. The mixture was cooled and the fibers were filtered, washed with three 300-ml portions of ethylene dichloride, and dried under vacuum overnight at 50°-60° C. Only a small weight increase was observed, and the surface area of the fibers was not significantly increased.

EXAMPLE 44

This example shows the dynamic adsorption capacity for some of the macronet fibers from the previous examples. Dynamic adsorption capacity was measured by passing an air stream containing a known concentration of vapor through a column containing the macronet fiber adsorbent, and measuring the concentration of vapor in the effluent air stream using a gas chromatograph with an appropriate detector.

The vapor-containing stream was produced by passing a stream of dry air through a closed container containing the liquid whose vapors are to be adsorbed. The vapor concentration thus produced was determined by passing a known volume of the air-vapor mixture through a tared, activated carbon column large enough to completely adsorb all the vapor. The activated carbon column was weighed after the mixture had passed through it, to determine the total weight of vapor in the known volume of air.

The exception to the foregoing procedure for determining vapor concentration was the case of a humid vapor-air mixture of diisopropyl fluorophosphate. This air-vapor mixture was passed through a sodium hydroxide solution which scrubbed all the diisopropyl fluorophosphate from the mixture, and the total fluorophosphate concentration was calculated from the measured fluoride content of the sodium hydroxide scrubbing solution, as determined by fluoride ion electrode.

The vapors adsorbed in this example are simulants of toxic agents: dimethyl methylphosphonate (DMMP), diisopropyl fluorophosphate (DFP) and 2-chloroethyl isobutyl sulfide (CIS).

The adsorbent fibers were placed in a 3-mm-diameter, glass column closed at the bottom end with a coarse sintered disk; the fiber sample was 50–100 mg, as indicated in Table IV. The air-vapor mixture was passed through the column at a flow rate of 40–75 ml/minute, equivalent to a linear flow rate of 9–17 cm/sec. The effluent from the column was split; a portion of it passed through a Hewlett-Packard Model 5880 gas chromatograph equipped with a flame ionization detector or nitrogen-phosphorus detector, as appropriate for the particular vapor, and the balance of the effluent was scrubbed through a bubble column containing 4% aqueous sodium hydroxide and was vented to a hood.

Breakthrough, defined as the time at which the concentration of the challenge vapor in the effluent stream reaches 1% of that in the influent stream, as determined from the gas chromatograph. Detector sensitivity was approximately 1 microgram/liter for DMMP and DFP, and approximately 10 micrograms/liter for CIS. The results of this example are shown in Table IV.

TABLE IV

| Sample from Example No. | Sample Weight (g) | Vapor Concentration (mg/liter) | Breakthrough Time (min) | Breakthrough Capacity (mg/g) |
|---|---|---|---|---|
| 3 | 0.0603 | 2.23 (DFP) | <3 | <8.3 |
| 3* | 0.0700 | 3.00 (DFP) | <5 | <16 |
| 3* | 0.0781 | 2.01 (DFP) | <3 | <5.8 |
| 1-C | 0.0724 | 2.97 (DFP) | <3 | <9.2 |
| 5 | 0.0616 | 2.40 (DFP) | 156 | 460 |
| 6 | 0.0690 | 2.40 (DFP) | 150 | 391 |
| 5 | 0.0530 | 2.38 (DFP) | 72 | 242 |
| 6 | 0.0580 | 2.38 (DFP) | 55 | 169 |
| 17 | 0.0939 | 1.75 (DFP) | 278 | 260 |
| 22 | 0.0337 | 1.85 (DFP) | 202 | 443 |
| 23 | 0.0730 | 1.85 (DFP) | 215 | 218 |
| 5 | 0.0650 | 2.60 (DMMP) | 109 | 327 |
| 6 | 0.0640 | 2.60 (DMMP) | 100 | 304 |
| 5 | 0.0509 | 1.53 (CIS) | 93 | 210 |
| 6 | 0.0469 | 1.53 (CIS) | 46 | 112 |

*Repeat preparations of Example 3.

EXAMPLES 45–46

These examples illustrate crosslinking swollen polymers containing active crosslinking sites; sulfuric acid is the catalyst for crosslinking. The resulting fibers contain sulfonic acid cation exchange functionality.

Five grams each of the fiber of Example 1A and 1B, chloromethylated according to the procedure of Example 2, were swollen in 300 ml of ethylene dichloride for two hours. To each fiber sample 50 ml of concentrated sulfuric acid was added, and the mixtures were heated to, and held at, the following temperatures for the following times:

40° C. —one hour
50° C. —one hour
60° C. —one hour
70° C. —one hour
85° C. (reflux)—six hours The mixtures were cooled to about 70° C. and the reaction was quenched by adding to each 125 ml of 60% aqueous sulfuric acid. The ethylene dichloride was evaporated under reduced pressure, the solutions were cooled to approximately room temperature and poured into fritted glass funnels. The treated fibers were washed three times with 250-300 ml of deionized water and three times with 250-300 ml of methanol, and were dried under vacuum overnight at 50°-60° C.

The dried fibers and untreated control fibers were tested for sulfur content, surface area by BET, and for their ability to adsorb diisopropyl fluorophosphate. Breakthrough time and capacity were determined as in Example 44. The results of these tests are shown in Table V.

TABLE V

| Sample | Sulfur, % | Surface area $m^2/g$ | Breakthrough Time (min) | Capacity (mg/g) |
|---|---|---|---|---|
| 1A | — | 5 | <3 | — |
| Example 45 | 5.01 | 58 | 91 ± 27 | 202 ± 45 |
| 1B | — | 3 | <3 | — |
| Example 46 | 4.87 | 49 | 46 ± 7 | 112 ± 40 |

EXAMPLE 47

This example illustrates the preparation of macronet fine particles from lightly crosslinked, chloromethylated, emulsion polymerized copolymer particles.

To a 500-ml flask fitted with a mechanical stirrer, reflux condenser vented through a water scrubber, thermometer and heating mantle was charged 10.0 g of dry, chloromethylated, styrene-1.8% divinylbenzene emulsion polymer particles having an average particle diameter of about 0.1 μm and prepared according to Chong, U.S. Pat. No. 4,359,537, Example 5, but dried after the initial wash and not treated with the imine or amine. To this 150 ml of technical-grade ethylene dichloride was added, and the mixture was allowed to stand overnight to swell the polymer. To the swollen polymer mixture was added 13.3 g of technical-grade aluminum chloride; the mixture was heated to reflux, and allowed to reflux overnight. The mixture was then cooled and the reaction quenched by adding, dropwise, 220 ml of acetone. The solid material was separated by filtration in a Büchner funnel; it was washed twice with acetone, twice with 3A denatured ethanol, with deionized water until the washings were neutral, and twice more with 3A denatured ethanol. The solid material was soxhlet extracted with 3A denatured ethanol for 5 hours, then dried under vacuum at 50° C. overnight. The resulting macronet polymer material had a surface area (BET) of 674 $m^2/g$.

EXAMPLE 48

This example illustrates the preparation of macronet fine particles from lightly crosslinked, unfunctionalized, emulsion polymerized copolymer particles.

To a flask as described in Example 47 was charged 10.0 g (dry basis) of styrene-1.8% divinylbenzene emulsion polymer particles having an average particle diameter of 0.1 μm and prepared according to Chong, U.S. Pat. No. 4,359,537, Example 1. To this 180 ml of technical-grade methylene chloride was added, and the mixture was allowed to stand for three hours to swell the polymer. To the swollen polymer mixture was added 20.0 g of technical-grade aluminum chloride; the mixture was heated to reflux and allowed to reflux for 18 hours. The mixture was then cooled and the reaction quenched by adding, dropwise, 250 ml of acetone. The solid material was separated, purified and dried according to the procedure of Example 47. The resulting macronet polymer material had a surface area (BET) of 546 $m^2/g$.

EXAMPLE 49

This example illustrates the preparation of macronet fine particles from lightly crosslinked, unfunctionalized, emulsion polymerized copolymer particles.

To a flask equipped as described in Example 47 was charged 10.0 g (dry basis) of styrene-0.5% divinylbenzene emulsion polymer particles having an average particle diameter of about 0.1 μm and prepared according to Chong, U.S. Pat. No. 4,359,537, Example 1. To this 200 ml of technical-grade methylene chloride was added and the mixture was allowed to stand overnight to swell the polymer. To the swollen polymer was added 20.0 g of technical-grade aluminum chloride; the mixture was heated to reflux and allowed to reflux for 20 hours. The mixture was then cooled and the reaction quenched by adding, dropwise, 150 ml of acetone. The solid material was, separated, purified and dried according to the procedure of Example 47. The resulting macronet polymer material had a surface area (BET) of 818 $m^2/g$.

EXAMPLE 50

This example illustrates crosslinking of lightly crosslinked, chloromethylated, emulsion polymerized copolymer particles following a brief swelling of the particles in a solvent, to form the macronet particles of the present invention.

To a 300-ml flask equipped as described in Example 47 was charged 5.0 g of the chloromethylated styrene-1.8% divinylbenzene emulsion polymer particles used in Example 47. To this 40 ml of ethylene dichloride was added. The mixture was stirred for three minutes at room temperature, then 3.9 ml stannic chloride was added in a single portion; the mixture was heated to reflux and allowed to reflux overnight. The mixture was then cooled and the reaction quenched by adding, dropwise, 30 ml of acetone. The solid material was separated, purified and dried according to the procedure of Example 47. The resulting polymer material had a surface area (BET) of 704 $m^2/g$ and a porosity (mercury intrusion) of 1.49 ml/g.

EXAMPLE 51

This example illustrates preparation of macronet fine particles from chloromethylated, emulsion polymerized copolymer particles, and the use of these particles for adsorption of a toxic-gas simulant.

The procedure of Example 50 was followed, except that the polymer was allowed to swell overnight before the stannic chloride was added, the mixture was refluxed for 7.5 hours, and the reaction was quenched with two 50-ml portions of acetone. The mixture was allowed to stand overnight after quenching; it was then filtered in a Büchner funnel, allowed to air dry, and dried under vacuum at 50° C. for three days.

The adsorption capacity of this sample, and a carbon sample of the prior art, under static conditions was determined as follows. A sample of the macronet emulsion-polymerized particles was weighed in a weighing bottle and placed in a desiccator, as was a weighed sample of BPL carbon, a coal-based activated carbon from Calgon Corporation. Dimethyl methylphosphonate was poured into the bottom of the desiccator, which was then sealed. The weighing bottles containing the macronet particle sample and the carbon sample were periodically capped, removed from the desiccator, weighed and returned to the desiccator. The weight gain from adsorption of the dimethyl methylphosphonate was reported as a weight percentage of the original sample weights, and is shown in Table VI.

TABLE VI

| Sample | STATIC CAPACITY (WT %) | | | | |
|---|---|---|---|---|---|
| | 1 day | 1 week | 2 week | 3 week | 4 week |
| Ex. 51 | 15.1 | 54.4 | 90.7 | 89.3 | 103.1 |
| BPL Carbon | 8.9 | 34.7 | 37.8 | 38.6 | 39.0 |

We claim:

1. A crosslinked polyaromatic polymer fiber having a macronet structure and a surface area of at least 100 $m^2/g$.

2. The fiber of claim 1 wherein the polyaromatic polymer forms the matrix fiber of a heterogeneous polymer fiber, and wherein a plurality of fibers of polyolefin are imbedded longitudinally in the matrix fiber.

3. The fiber of claim 1 wherein the polyaromatic polymer is selected from the group consisting of poly(styrene) and poly(alpha-methylstyrene).

4. The fiber of claim 2 wherein the polyolefin is selected from the group consisting of polypropylene and polybutenes.

5. The fiber of claim 3 wherein the fiber possesses chemical functionality suitable for adsorptive, organic-reactive or ion-exchange phenomena.

6. The fiber of claim 5 wherein the functionality is ion-exchange functionality.

7. The fiber of claim 6 wherein the functionality is cation-exchange functionality.

8. The fiber of claim 7 wherein the functionality is sulfonic acid functionality.

9. A crosslinked polyaromatic polymer fiber having a macronet structure and a surface area of at least 100 $m^2/g$, prepared by swelling the fiber in a swelling agent for the crosslinked polymer, which swelling agent is removable, does not deactivate Friedel-Crafts catalysts and does not interfere with the formation of a macronet structure, and subsequently introducing additional crosslinking into the polymer to stabilize its swollen structure.

10. The fiber of claim 9 wherein the swelling agent is removed subsequent to introducing the additional crosslinking.

* * * * *